Jan. 19, 1965   R. P. ROWAND ETAL   3,166,688
POLYTETRAFLUOROETHYLENE TUBING HAVING
ELECTRICALLY CONDUCTIVE PROPERTIES
Filed Nov. 14, 1962
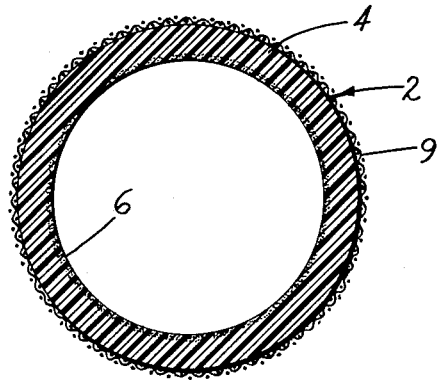
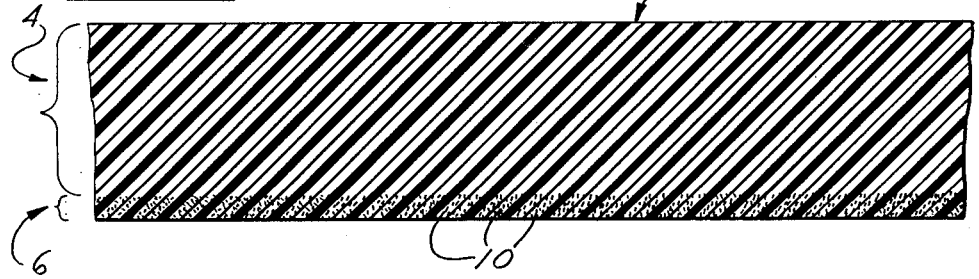
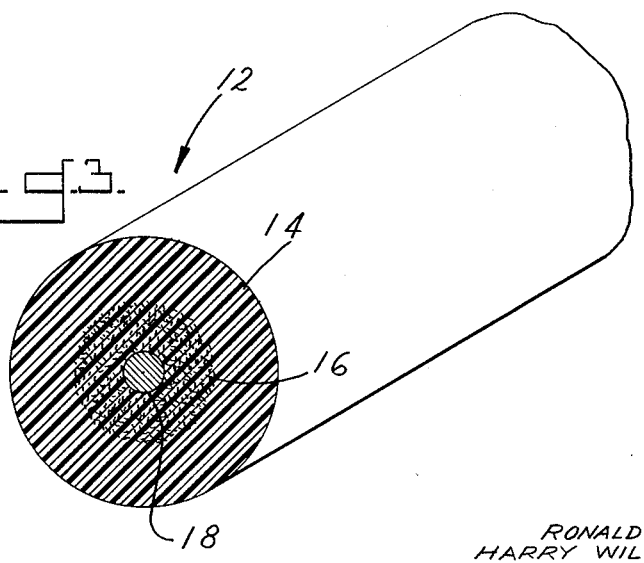
INVENTORS.
RONALD P. ROWAND
HARRY WILLIAM LaROSE, JR.
BY Chapin & Neal
attorneys

United States Patent Office 3,166,688
Patented Jan. 19, 1965

---

3,166,688
POLYTETRAFLUOROETHYLENE TUBING HAVING ELECTRICALLY CONDUCTIVE PROPERTIES
Ronald P. Rowand, 24 Nevins Ave., and Harry William La Rose, Jr., 117 Sheffield Ave., both of Longmeadow, Mass.
Filed Nov. 14, 1962, Ser. No. 238,322
5 Claims. (Cl. 317—2)

This invention relates to tubing extruded from polytetrafluoroethylene. More particularly it relates to thin wall tubing of such material and provides an electrically conductive path confined to a portion of the wall such as an inner wall section of the tubing so as to be capable of harmlessly dissipating static electrically energy which results, for example, from pumping petroleum fuels through such tubing on fuel hose line installations of aircraft engines.

This application is a continuation-in-part of U.S. application Serial No. 228,626, filed October 5, 1962 and now abandoned.

Polytetrafluoroethylene, commonly known by the commercial trade name of "Teflon" and hereafter referred to by that name, is used extensively in extruded tube form for aircraft engine fuel hose lines and the like where extreme conditions of temperature and pressure are encountered during engine operation and where a high degree of satisfactory performance and useful life is essential. Where reliable performance characteristics of such a nature are required the extruded tubing is, of course, previously subjected to rigid inspection procedures and must meet certain specifications and tests before acceptance for installation.

In such use of Teflon tubing a fuel line is conventionally covered with an armored sheath as a flexible wire braid covering. Although rigidly inspected and tested equipment heretofore has indicated satisfactory performance was to be expected over a long period of time it was found that premature failures and leakage frequently occurred. It was then found that an electrostatic charge gradually built up in the lines and that this frequently failed to be harmlessly dissipated to and through the metal of an end fitting or otherwise as might have been anticipated. Rather it appeared in certain failures that the static electricity was discharging by arcing through the Teflon wall and was thus grounded by way of the metal of the wire braid covering. A minute pin hole was formed in the wall structure by the arcing and thus caused the tube leakage. The object of this invention is to prevent this type of failure.

Teflon tubing as used for high performance aircraft fuel lines and as conduits for other "exotic" fuels is conventionally extruded as "pure" or natural Teflon. It may also be extruded with certain additives claimed to have beneficial effects in one respect or another. An example of one such additive is a small amount of carbon black believed to create a more satisfactory union or bond between lengths of thin wall tubing when continuously extruded from successive preforms in the paste extrusion process now well known in the art. Other materials or "fillers" are also sometimes used for pigmentation purposes.

Extruded natural Teflon is generally light or "white" in color and more or less translucent. When tubing is extruded without dark pigments and as "white" tubing, many localized defects such as blisters, cracks and splits can be readily detected by the naked eye as well as the other possible surface defects such as pits, depressions, or rippled surfaces. This has a distinct advantage in that inspection procedures can be simplified by the manufacturer. Furthermore, the customer or user is assured to a great degree of the quality of the tubing supplied by the fact that his own visual inspection will indicate whether it has any of the many different types of imperfections which might otherwise not appear as defects in sample testing of production run tubing.

On the other hand when carbon black and other pigments rendering the finished tubing completely opaque are used for any purpose the many imperfections which would otherwise be apparent in "white" tubes are effectively concealed. Obvious surface defects may be detected but less obvious imperfections leave no tell-tale markings whatsoever because of the dark coloring. Such tell-tale markings in the wall of translucent "white" tubing indicate areas where further inspection is desirable so as to determine whether serious defects do in fact exist.

Accordingly where the performance characteristics desired for a particular tubing are important the opportunity for inspection afforded by "white" Teflon tubing is of prime importance. This invention is designed to preserve to a large degree the advantages of an opportunity for visual inspection and thus more adequate control in connection with overall inspection and testing procedures. At the same time the tube is designed to provide a definite path for discharge of static electricity from the tube interior. This path is preferably confined to the interior portion of the tubing wall so that the remaining outer portion of the wall forms an excellent dielectric barrier against arcing to the conventional wire braid armored sheath.

These and other objects and advantages of the invention will be apparent from the following description of an embodiment thereof as shown by the accompanying drawings in which:

FIG. 1 is an enlarged cross sectional view of Teflon tubing embodying the invention and shown with a surrounding wire braid sheath;

FIG. 2 is an enlarged longitudinal sectional view of the tube wall; and

FIG. 3 is a pictorial view of a preform which may be used in the extrusion process to make a tube having the characteristics illustrated by FIGS. 1 and 2.

In the drawings the tubing 2 is shown having an outer and an inner annulus as the cylindrical portions 4 and 6 respectively. Portions 4 and 6 are preferably integrally formed together in the extrusion of a single unitary tube 2. As will be appreciated by those skilled in the art a cylindrical "preform" having concentrically located portions of Teflon material, with the inner portion admixed with a suitable "filler" as will be explained, may be inserted in a ram type extruder and the raw tubing formed thereby with subsequent heating and sintering steps in accordance with known practices so as to obtain a finished extruded Teflon tube product.

The tube 2 as made from a preform 12 such as that shown by FIG. 3 is a homogeneous unitary body, the inner cylindrical portion 6 of which is characterized by having confined thereto a filler material having electrically conductive properties. Such material may be dispersed throughout the Teflon of portion 6 and a path is thus created for dissipating static electricity and preventing an excessive build up sufficient to permit arcing through the natural Teflon of the outer portion 4. A well known property of natural Teflon is its excellent dielectric character. Portion 4 is preferably maintained substantially completely dielectric so as to assure confinement of the static electricity to the passage or path defined by portion 6.

As shown portion 4 comprises the major portion of the wall while portion 6 may be extremely thin and ribbon-like in cross section. By way of a specific example a thin wall tube having a .049 inch wall may be formed with an inner .008 inch annulus provided with an electrically conductive material admixed with the natural Teflon. Such a tube when used with a braided wire sheath 9 (FIG. 1) as an armored fuel hose gives superior service for aircraft fuel lines as compared with tubing having the same dimensions and extruded entirely of natural Teflon. It is also superior to a tube extruded from a Teflon preform entirely admixed with a conductive filler material having the same proportions as the portion 6 of tube 2.

A small amount of carbon black preferably serves as an electrically conductive material for incorporating with the natural Teflon powder in making up a preform as in FIG. 3 for ram type extrusion of tubing. The inner cylinder portion 16 of the preform 12 surrounding a mandrel 18 is made by partitioning the space between the mandrel and the preform cylinder by a cylinder (not shown) located concentrically of the mandrel and preform cylinder and filling the inner section with a mixture of the Teflon material and the conductive filler. The outer section is also filled, preferably with natural Teflon only, although an admixture with a non-conductive filler may be used to retain a substantially completely dielectric character. The partitioning member is then removed and the powder preformed under conventional pressures. The two annuli 16 and 14 form a solid preform being bonded together as an integral mass and the preform is extrudable into a thin wall tubing having the cross section of FIGS. 1 and 2.

In the extruded tube the dispersion of carbon black material throughout the natural Teflon provides the path or passage for conducting static electricity from the interior of the tube to the end thereof where it may be grounded through the conventional metal of an end fitting.

In FIG. 2 the molecules of the carbon black powder are depicted at 10 and being strung out within the inner annulus 6 and confined to this portion, it will be appreciated that a static electric charge is able to find an outlet path for discharge to an end fitting without arcing over to the wire braid. In other words as electrical energy builds up sufficiently within the tube, portion 6 acts as a grounding ribbon whereby an electric charge strong enough to pass from particle to particle of the carbon black powder will be dissipated through the length of the tube before building up energy sufficient to arc through the barrier of the annulus portion 4.

From FIG. 2 it can also be seen that if the particles of carbon black or other conductive material extended throughout the wall and thus to the outer tube surface, electrical energy could then pass via the conductive particles to the wire braid covering, particularly in those locations where the hose might be flexed and the tube in actual contact with the braid. In such cases the arcing, though of less intensity than that which occurs when a charge is sufficient to ground out through a wall entirely of natural Teflon, nevertheless such lesser arcing can cause pitting and deterioration of wall structure with eventual tube leakage.

The amount of carbon black in the inner portion 6 may be relatively small as mentioned above. The amount for any given tube or hose application can be governed according to the performance characteristics desired for a particular installation and the known tendency of particular fluids to build up static electricity to a greater or lesser degree. It will, of course, be generally recognized that as the concentration of carbon black is increased in the admixture, the effectiveness of the inner annulus for more efficient discharge of static electricity is increased by the better electrically conductive properties of the annulus. The addition of anywhere from .10% to 1.0% by weight of carbon black as compared to the weight of the pure or natural Teflon powder has been found satisfactory. Less than .10% of carbon black in the admixture would be effective for some uses but for overall satisfactory performance the amount should preferably be at least .10%. As the concentrations of carbon black content rise above 1.0% the quality of the Teflon for extruding for hydraulic and pneumatic purposes may begin to be impeded. Amounts larger than 1.0%, may, of course, be used successfully where the quality of the Teflon wall for hydraulic or pneumatic purposes may be comprised in the interest of more efficient conductivity for discharging static electricity. Up to approximately four percent carbon black content can be used where the quality of the Teflon inner wall is not of a critical nature.

It will be understood that by natural or "pure" Teflon is meant unadulterated polytetrafluoroethylene in fine powder form (DuPont's "Teflon 6C" being a current grade designation). The carbon black is preferably a finely divided channel black of fluffy composition having a particle size approximating 15 to 20 millimicrons.

In place of carbon black other electrically conductive filler materials may be employed to establish a confined path of localized nature in the tubing wall. Fine aluminum powders in flake form and in approximately the same weight percentages have resulted in good extrusions.

Having disclosed our invention what is claimed as novel and desired to be protected by Letters Patent is:

1. A tube of polytetrafluoroethylene and the like for conducting fluids under pressure and including means for discharge of internal static electricity to the ends of the tube and grounding the same from the tube interior at said ends in order to maintain the polytetrafluoroethylene tubing performance characteristics, said tubing having an integral polytetrafluoroethylene wall structure with an interior liner portion of a substantially annular conformation from end to end and having a uniform dispersion of electrically conductive particles embedded therein, the major portion of said tubing wall completely surrounding said liner portion exteriorly and being relatively non-conductive in character, said surrounding portion together with said liner containing fluid under pressures uniformly within said tubing.

2. The tubing as in claim 1 in which said interior liner portion has a uniform dispersion of carbon black powder embedded therein.

3. Tubing as in claim 2 in which the said liner portion is a true annulus and the carbon black powder dispersion therein is in an amount weighing approximately .10 to 1.0% of the weight of polytetrafluoroethylene in said annulus.

4. Tubing as in claim 3 in which the polytetrafluoroethylene is natural polytetrafluoroethylene and the said major portion thereof is polytetrafluoroethylene translucent in character.

5. Tubing as in claim 4 in which said composite structure is an extruded homogeneous wall.

References Cited by the Examiner
UNITED STATES PATENTS

| | | | |
|---|---|---|---|
| 1,901,330 | 3/33 | Poberejsky | 317—2 X |
| 2,108,759 | 2/38 | Turman | 317—2 X |
| 3,070,132 | 12/62 | Sheridan | 317—2 X |

SAMUEL BERNSTEIN, *Primary Examiner.*

Notice of Adverse Decision in Interference

In Interference No. 95,106 involving Patent No. 3,166,688, R. P. Rowand and H. W. La Rose, Jr., POLYTETRAFLUOROETHYLENE TUBING HAVING ELECTRICALLY CONDUCTIVE PROPERTIES, final judgment adverse to the patentees was rendered May 28, 1968, as to claims 1, 2, 3, 4 and 5.

[*Official Gazette December 17, 1968.*]